United States Patent [19]

Herzog et al.

[11] Patent Number: 5,307,638
[45] Date of Patent: May 3, 1994

[54] PROCESS TO RECOVER SOLVENTS FROM WASTE GASES

[75] Inventors: Friedhelm Herzog, Krefeld; Thomas Kutz, Viersen; Franz R. Schlömer, Dormagen; Heinz J. Schmidt, Josef Steins; Martin Schulte-Rewinkel, Willich, all of Fed. Rep. of Germany

[73] Assignee: Messer Griesheim, GmbH, Fed. Rep. of Germany

[21] Appl. No.: 961,154

[22] Filed: Oct. 15, 1992

[30] Foreign Application Priority Data

Oct. 17, 1991 [DE] Fed. Rep. of Germany ....... 4134293

[51] Int. Cl.$^5$ .................... F25J 5/00; F25J 1/00; F28D 15/00
[52] U.S. Cl. ................................. 62/12; 62/8; 62/9; 62/17; 62/62; 165/104.15; 165/104.18
[58] Field of Search ............... 62/8, 9, 12, 17, 62; 165/104.15, 104.18

[56] References Cited

U.S. PATENT DOCUMENTS

| | | | |
|---|---|---|---|
| 2,432,872 | 12/1947 | Ferro, Jr. | 165/104.15 X |
| 2,537,045 | 1/1951 | Garbo | 165/104.18 X |
| 2,580,635 | 1/1952 | Winter, Jr. | 165/104.18 X |
| 2,607,440 | 8/1952 | Lewis | 165/104.18 X |
| 2,796,237 | 6/1957 | Nettel | 165/104.18 |
| 2,905,596 | 9/1959 | Findlay | 165/104.18 X |
| 2,966,037 | 12/1960 | Gifford | 165/104.18 X |
| 3,233,660 | 2/1966 | Nettel et al. | 165/104.15 |
| 3,242,975 | 3/1966 | Kogan | 165/104.18 X |
| 3,488,042 | 1/1970 | Brzozowski et al. | 165/104.18 X |

FOREIGN PATENT DOCUMENTS

| | | | |
|---|---|---|---|
| 557552 | 5/1958 | Canada | 165/104.15 |
| 578432 | 6/1959 | Canada | 165/104.18 |
| 907780 | 2/1954 | Fed. Rep. of Germany | 165/104.18 |
| 1032766 | 6/1958 | German Democratic Rep. | 165/104.15 |
| 796216 | 6/1958 | United Kingdom | 165/104.15 |
| 929989 | 6/1963 | United Kingdom | 165/104.18 |

Primary Examiner—Henry A. Bennet
Assistant Examiner—C. Kilner
Attorney, Agent, or Firm—Connolly & Hutz

[57] ABSTRACT

The recovery of solvents from waste gases takes place according to the state of the art by condensation, freezing out or desublimation of the solvent in recuperative cold reservoirs which can be switched over. In order to reduce the amount of equipment and the cold losses, the condensation and freezing-out operations are run continuously in a shaped-object reservoir through which cooled shaped objects move in a countercurrent to the waste gas.

17 Claims, 2 Drawing Sheets

PROCESS TO RECOVER SOLVENTS FROM WASTE GASES

BACKGROUND OF THE INVENTION

In order to recover solvents from waste gases or else in order to purify waste gases, condenser coolers or recuperative cold reservoirs are used, through which the solvent flows, a process during which the solvents condense out and freeze out. As soon as sufficient solvent has been separated, the flow of waste gas is guided through another group of condenser coolers. The first group is warmed up, and the solvent can be removed as a liquid product. A device of this type is disclosed, for instance, in German preliminary published application no. DE-OS 34 14 246.

Even though the processes according to the state of the art function satisfactorily, they require elaborate equipment since a double-installation is necessary to freeze out and to thaw the solvents. Furthermore, the mode of alternating operations calls for high energy consumption.

SUMMARY OF THE INVENTION

Therefore, the invention is based on the task of creating a process to recover solvents from waste gases or else to purify waste gases, which can be carried out continuously, that is to say, without alternating operations.

Accordingly, the inventive idea consists of continuously passing cooled shaped objects, for example, steel spheres, through a shaped-object reservoir. The gas to be purified flows in a countercurrent through the shaped-object reservoir. In this process, the waste gas cools off to such an extent on the shaped objects that the solvent or other vapors to be removed are then separated. The solvent separated in the solid state reaches the lower section of the shaped-object reservoir together with the shaped objects and then it melts due the presence of higher temperatures there. The melted ice drips down together with the resulting condensate and is then carried off to the outside. The warmed up shaped objects are removed from the shaped-object reservoir through a transfer lock and conveyed back to the inlet of the shaped-object reservoir. In this process, they are cooled off in a heat exchanger which can be operated, for example, with liquid nitrogen as the coolant. In a preferred embodiment, prior to cooling off in the heat exchanger, the shaped objects pass through an additional packing in which a flow of cold, purified waste gas passes through these objects and pre-cools them. This packing can also be cooled by means of evaporated nitrogen from the heat exchanger. In another preferred embodiment, the shaped objects removed from the shaped-object reservoir are passed through a dryer before they move to the conveying device.

Commonly employed recovery processes entail the disadvantage that, when the solvent is frozen out, the pressure drop in the devices increases steadily, thus giving rise to a non-stationary mode of operation. After a short period of time, the pressure loss is so great that it becomes necessary to switch the waste-gas flow over to a second device while the first one is warmed up and thawed. The cold losses associated with this, the heating energy additionally needed, the complicated equipment and the switching-over all are avoided with the process according to the invention, since freezing up cannot occur as a result of the continuous transportation of the shaped objects from the cold end to the warm end of the shaped-object reservoir. All of the process steps take place simultaneously and continuously, so that devices corresponding to the process according to the invention can be operated in a stationary manner.

THE DRAWINGS

DETAILED DESCRIPTION

Figure 1:
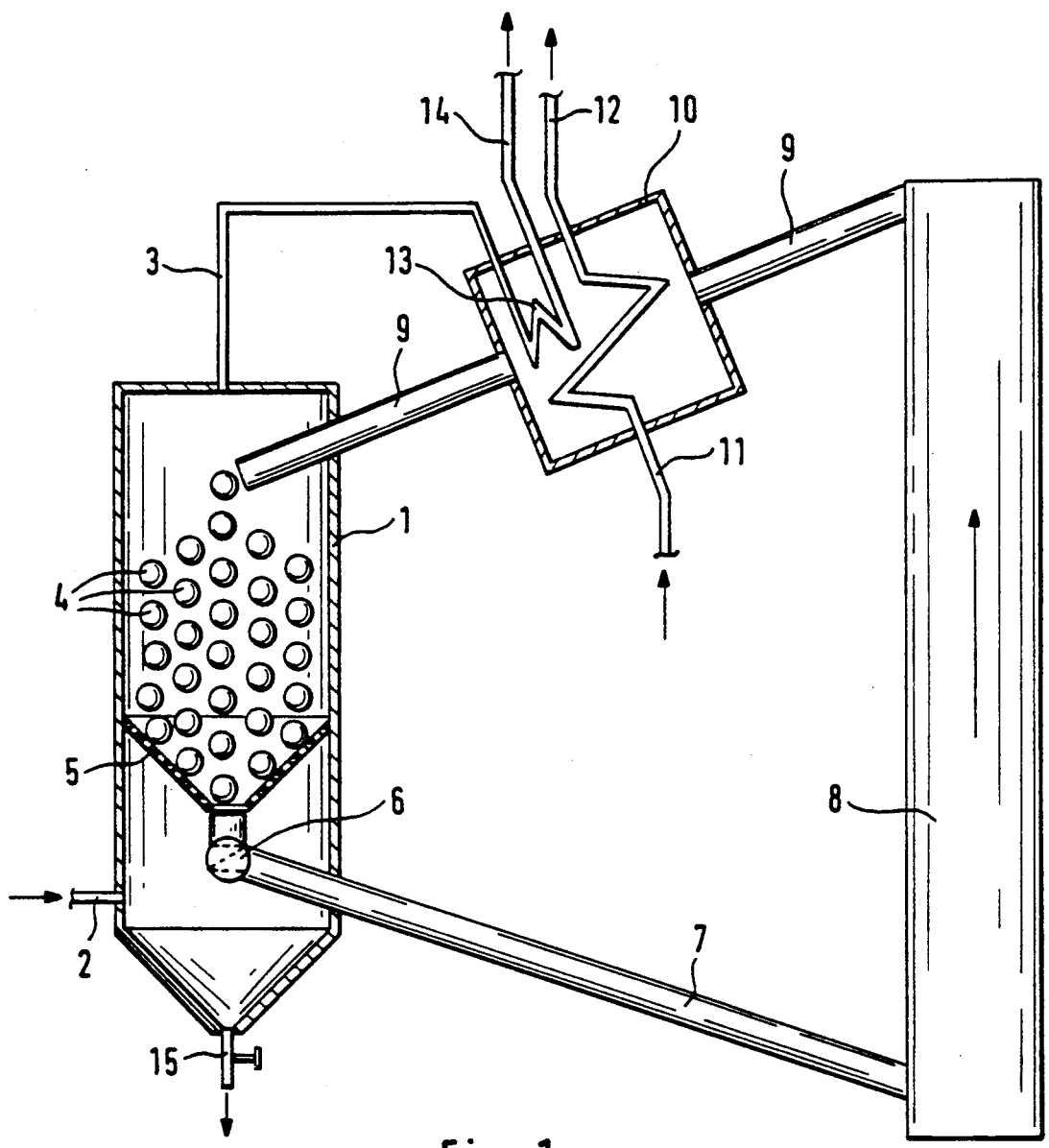
FIG. 1 shows a device for carrying out the process in schematic form.

The device shown in FIG. 1 consists of a shaped-object reservoir 1 whose lower section has a connection 2 for the feeding of the waste gases and whose upper section has a connection 3 for the removal of the waste gases. The middle section of the shaped-object reservoir 1 is filled with shaped objects 4 which are steel spheres. The shaped objects 4 lie on a funnel-like perforated plate 5 which ends in a transfer lock 6 which serves for the removal of the shaped objects. Connected to this transfer lock 6, there is a removal tube 7 which leads to a conveying device 8 for the shaped objects. In a corresponding manner, a charging tube 9 leads from the conveying device 8 back to the upper section of the shaped-object reservoir 1. The charging tube 9 is interrupted by a heat exchanger 10. The heat exchanger 10 has a connection 11 which serves to supply liquid nitrogen as the coolant and a connection 12 which serves to remove the gaseous nitrogen which has evaporated. Moreover, in the heat exchanger 10, there is a cooling surface 13 which is linked to the connection 3 and from which a connection 14 leads out of the heat exchanger 10. There is a drain 15 on the bottom of the shaped-object reservoir 1. The arrows (which do not have any position numbers) indicate the direction of flow of the materials.

Below, the process for recovering solvents from waste gas is described with reference to the device shown in FIG. 1.

Shaped objects 4 leave the conveying device 8 through the charging tube 9 and move to the shaped-object reservoir 1, in which they form a packing which lies on the perforated plate 5. The charging tube 9 is interrupted by a heat exchanger 10 in which the shaped objects 4 are cooled off. The cooling off is done by means of liquid nitrogen which is fed into the heat exchanger 10 through the connection 11 and which is then removed in gaseous form through the connection 12. There is an additional cooling of the shaped objects 4 on the cooling surface 13 which is exposed to cold, purified waste gas from the shaped-object reservoir 1. By means of the transfer lock 6, the shaped objects 4 are fed back to the conveying device 8 through the removal tube 7. The amount of shaped objects 4 removed is regulated by the operation of the transfer lock 6. Therefore, the shaped objects 4 continuously move from the top to the bottom through the shaped-object reservoir 1.

The waste gas loaded with solvents passes through the connection 2 into the lower section of the shaped-object reservoir 1. Then the waste-gas flows in a countercurrent with respect to the shaped objects 4 through the shaped-object reservoir 1 towards the top and then leaves this unit through connection 3. In this process, the waste gas cools off on the shaped objects 4 to such an extent that the solvents freeze out. The solvent ice reaches the lower section of the shaped-object reservoir 1 together with the shaped objects and melts, since the temperatures are higher there. The melted ice drips down together with the condensate which has formed in the lower section of the device and is then carried off to the outside through the drain 15. The shaped objects 4 warmed up by the waste-gas flow pass through the transfer lock 6 and through the removal tube 7 and move back to the conveying device 8, while the cold, purified waste gas passes through the connection 3, the cooling surface 13 and the connection 14 on its way out of the device. Naturally, the cold, purified waste gas can also be directly removed through the connection 3 without utilizing its coldness in the heat exchanger 10.

Figure 2:
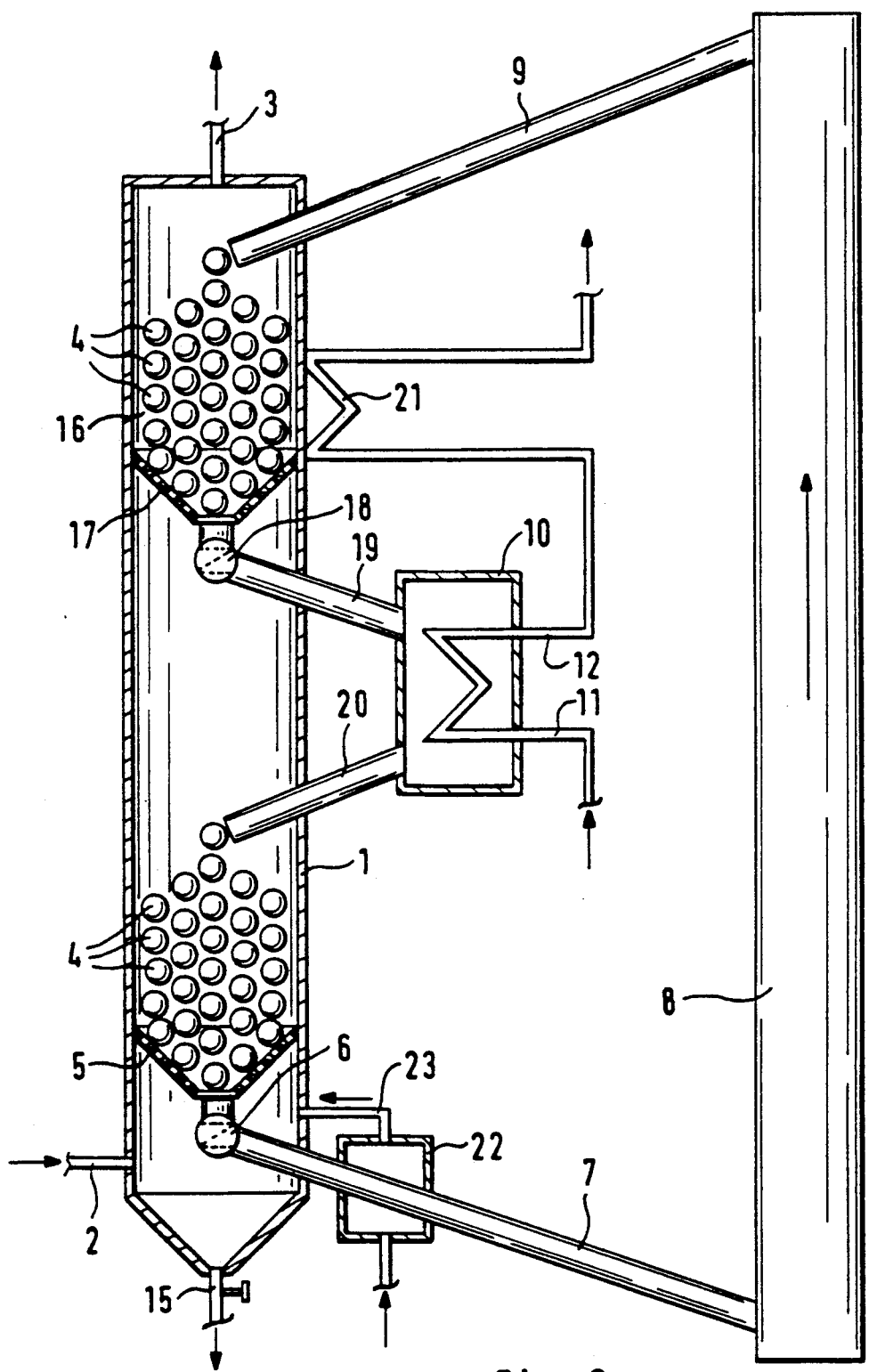
FIG. 2 shows a variant of the device according to FIG. 1, having an additional packing.

FIG. 2 shows a variant of FIG. 1 in which the same reference numbers are employed for the same parts of the installation. The main difference lies in the fact that there is an additional packing 16 of shaped objects 4 which likewise lie on a perforated plate 17 and which can be circulated by means of a transfer lock 18. The packing 16 is integrated into the shaped-object reservoir 1, although it can also be arranged separately. From the packing 16, the shaped objects 4 move through the transfer lock 18 and the removal tube 19 to the heat exchanger 10. Then they pass through the charging tube 20- which corresponds to the charging tube 9 of FIG. 1- and return to the shaped-object reservoir 1. The heat exchanger 10 is likewise exposed to liquid nitrogen which, however, still serves to pre-cool the packing 16 by means of the cooling surface 21 after the nitrogen has been removed through the connection 12 in the gaseous state from the heat exchanger 10. Furthermore, the cold, purified waste gas also passes through the packing 16 before it is removed from the installation through the connection 3. A difference from the embodiment according to FIG. 1 is that the shaped objects removed through the transfer lock 6 and the removal tube 7 also pass through a dryer 22. Purified waste gas or nitrogen can be used for purposes of drying. The drying medium is likewise removed from the dryer 22 through line 23 and fed into the shaped-object reservoir 1, thus making it possible to remove the condensate and solvent components absorbed in the dryer 22. These condensate and solvent components can also be removed separately in an additional condenser.

The shaped objects can consist, for instance, of ceramic or glass. They can also be hollow and contain a filling which stores coldness or they can be coated.

What is claimed is:

1. A device for recovering solvents from waste gas comprising a reservoir having an upper end and a lower end, a tube system external of said reservoir communicating with said upper end and said lower end of said reservoir to form a closed circuit path of flow, shaped objects consisting of spheres being conveyed in said reservoir in a direction from said upper end to said lower end of said reservoir, a perforated plate in said reservoir collecting said spheres at a location between said upper end and said lower end to form a packing, a transfer lock mounted to said perforated plate for controllably discharging and controlling movement of said spheres from said plate and into said tube system whereby said spheres are continuously conveyed through said closed circuit path, including a heat exchanger in said tube system externally of said reservoir, said spheres passing through said heat exchanger for cooling said spheres externally of said reservoir, a waste gas inlet communicating with said reservoir at said lower end of said reservoir below said plate for feeding the waste gas through said reservoir in a direction countercurrent to said path of flow of said spheres and through said plate whereby said spheres cool the waste gas to freeze out solvents contained in the waste gas so that the solvents solidify and fall downwardly into the lower end of said reservoir where frozen solvent is contacted by warmer waste gas to melt the solvent and with the waste gas continuing to flow upwardly in said reservoir, said lower end of said reservoir having a drain below said waste gas inlet for removing the melted solvents from said lower end of said reservoir, and a waste gas outlet at said upper end of said reservoir for removing cold purified waste gas from said reservoir.

2. The device according to claim 1 wherein said plate and said transfer lock comprise means for preventing contact between the waste gas and said spheres at a location below said plate and said transfer lock to facilitate the melting of the downwardly falling solvents.

3. The device according to claim 2 wherein said heat exchanger includes a chamber, said tube system including a first tube communicating with an upstream portion of said chamber and a second tube communicating with a downstream portion of said chamber whereby said spheres enter said chamber through said first tube and then said spheres are conveyed through said chamber with said spheres leaving said chamber through said second tube to enter said reservoir.

4. The device according to claim 3 wherein said chamber is cooled by nitrogen fed through said chamber.

5. The device according to claim 4 wherein said waste gas outlet includes a pipe extending through said chamber for pre-cooling said spheres with the cold purified waste gas leaving said upper end of said reservoir.

6. The device according to claim 3 including a dryer mounted externally of said reservoir, said tube system including a tube extending from said lock transfer through said dryer, and a drying medium being conveyed through said dryer and into said reservoir for subjecting said spheres to a drying action.

7. The device according to claim 3 wherein said plate comprises a first plate, said transfer lock comprising a first transfer lock, a second plate mounted in said reservoir upstream from and above said first plate, a second transfer lock mounted to said second plate, said tube system including tube means leading from said second transfer lock and extending externally of said reservoir and back into said reservoir to feed said spheres from said second plate and then externally of said reservoir and then back to said reservoir for collection on said first plate.

8. The device according to claim 7 including a dryer mounted externally of said reservoir, said tube system including a tube extending from said first lock transfer through said dryer, said first transfer lock conveying said spheres through said dryer, and a drying medium being conveyed through said dryer and into said reservoir for subjecting said spheres to a drying action.

9. The device according to claim 8 wherein said heat exchanger includes a chamber, said second transfer lock communicating with an upstream portion of said chamber, and said tube system including a tube communicating with a downstream portion of said chamber and with said reservoir for conveying said spheres back into said reservoir after said spheres pass through said heat exchanger.

10. In a process to recover solvents from waste gases including providing a closed circuit path of flow from a reservoir to a tube system external of the reservoir and in flow communication with the reservoir, wherein the solvent is recovered by a) conveying shaped objects in the form of spheres through the closed circuit path of flow in a direction from an upper end to a lower end of the reservoir and then through the tube system and then back to the upper end of the reservoir, b) collecting the spheres on a perforated plate in the reservoir between the upper and lower ends to form a packing in the reservoir, c) transferring the spheres by means of a transfer lock mounted to the perforated plate to controllably convey the spheres from the plate to the tube system, d) cooling the spheres by passing the spheres through a heat exchanger in the tube system externally of the reservoir, e) feeding a solvent containing waste gas through an inlet into the lower end of the reservoir below the perforated plate, f) conveying the waste gas in a direction countercurrent to the direction of flow of the spheres, g) passing the waste gas through the perforated plate and into contact with the cooled spheres, h) freezing out the solvents contained in the waste gas to solidify the solvents, i) permitting the solidified solvents to fall downwardly in the reservoir below the inlet of the waste gas; j) melting the solvents in the lower end of the reservoir by means of the lower end having a higher temperature than the upper end, k) draining the melted solvents from the lower end of the reservoir below the waste gas inlet, and l) discharging the cold purified waste gas from the upper end of the reservoir.

11. The process according to claim 10 including confining contact between the waste gas and the spheres to a location above the plate and transfer lock to prevent contact between the falling solvents and the spheres to facilitate the melting of the falling solvents.

12. The process according to claim 11 wherein the heat exchanger is in the form of a chamber, and including the steps of feeding the spheres into the chamber at an upstream portion of the chamber then passing the spheres through the chamber, then feeding the spheres out of the chamber at a downstream portion of the chamber, and then feeding the spheres into the reservoir.

13. The process according to claim 12 including cooling the spheres by feeding nitrogen through the heat exchanger.

14. The process according to claim 13 including feeding the waste gas from the upper end of the reservoir through a waste gas line extending into and out of the heat exchanger chamber for pre-cooling the spheres with cold purified waste gas.

15. The process according to claim 12 including providing a dryer externally of the reservoir, feeding the spheres through a portion of the tube system extending through the dryer, and feeding a drying medium through the dryer and into the reservoir below the plate.

16. The process according to claim 12 wherein the plate and transfer lock are a first plate and a first transfer lock and a second plate and a second transfer lock are in the reservoir above and upstream from the first plate and the first transfer lock, including the steps of feeding the spheres from the second transfer lock and into the heat exchanger and then feeding the spheres back to the reservoir to be collected by the first plate.

17. The process according to claim 16 including providing a dryer externally of the reservoir, feeding the spheres through a portion of the tube system which extends through the dryer, and feeding a drying medium through the dryer and into the reservoir below the first plate.

* * * * *